(12) United States Patent
Fukuda et al.

(10) Patent No.: US 8,685,363 B2
(45) Date of Patent: *Apr. 1, 2014

(54) HONEYCOMB CARRIER FOR EXHAUST GAS CLARIFICATION CATALYST AND METHOD FOR PRODUCTION THEREOF

(75) Inventors: Tsutomu Fukuda, Kakogawa (JP); Masahiro Fukuda, Uji (JP); Masaaki Fukuda, Kakogawa (JP); Toshinobu Yoko, Uji (JP); Masahide Takahashi, Uji (JP)

(73) Assignee: Ohcera Co., Ltd., Osaka-shi (JP)

( * ) Notice: Subject to any disclaimer, the term of this patent is extended or adjusted under 35 U.S.C. 154(b) by 1051 days.

This patent is subject to a terminal disclaimer.

(21) Appl. No.: 10/566,270

(22) PCT Filed: Jul. 29, 2004

(86) PCT No.: PCT/JP2004/011203
§ 371 (c)(1),
(2), (4) Date: Jan. 30, 2006

(87) PCT Pub. No.: WO2005/009918
PCT Pub. Date: Feb. 3, 2005

(65) Prior Publication Data
US 2006/0239880 A1    Oct. 26, 2006

(30) Foreign Application Priority Data

Jul. 29, 2003 (JP) .................................. 2003-203271
Sep. 12, 2003 (JP) .................................. 2003-321537

(51) Int. Cl.
*C01G 23/00* (2006.01)
*C04B 35/00* (2006.01)

(52) U.S. Cl.
USPC ......... 423/598; 423/212; 423/213.5; 501/136

(58) Field of Classification Search
USPC ............... 423/212, 213.5, 598; 502/159, 523, 502/527, 182, 185; 501/136
IPC .................................. C01G 23/00; C04B 35/00
See application file for complete search history.

(56) References Cited

U.S. PATENT DOCUMENTS 4,483,940 A * 11/1984 Ono et al. ..................... 502/159
5,846,276 A    12/1998 Nagai et al.
(Continued)

FOREIGN PATENT DOCUMENTS

EP    1 338 581 A1    8/2003
EP    1 645 319 A1    4/2006
(Continued)

OTHER PUBLICATIONS

Machine translation of JP2002-145659.*
(Continued)

*Primary Examiner* — Jun Li
(74) *Attorney, Agent, or Firm* — Oblon, Spivak, McClelland, Maier & Neustadt, L.L.P.

(57) ABSTRACT

A honeycomb carrier for an exhaust gas-cleaning catalyst to clean e.g. an exhaust gas of an automobile particularly containing NOx, wherein the material for the honeycomb carrier is an aluminum magnesium titanate sintered product obtained by firing at from 1,000 to 1,700° C. a molded product formed from a raw material mixture comprising 100 parts by mass, as calculated as oxides, of a mixture comprising a Mg-containing compound, an Al-containing compound and a Ti-containing compound in the same metal component ratio as the metal component ratio of Mg, Al and Ti in an aluminum magnesium titanate represented by the empirical formula $Mg_xAl_{2(1+x)}Ti_{(1+x)}O_5$ (wherein $0 \leq x \leq 1$), and from 1 to 10 parts by mass of an alkali feldspar represented by the empirical formula $(Na_yK_{1-y})AlSi_3O_8$ (wherein $0 \leq y \leq 1$).

15 Claims, 1 Drawing Sheet

(56) References Cited

U.S. PATENT DOCUMENTS

| | | | |
|---|---|---|---|
| 7,011,788 B2 | 3/2006 | Fukuda et al. | |
| 2001/0056034 A1* | 12/2001 | Noda et al. | 502/243 |
| 2005/0181929 A1 | 8/2005 | Fukuda et al. | |
| 2006/0009347 A1 | 1/2006 | Fukuda et al. | |

FOREIGN PATENT DOCUMENTS

| | | |
|---|---|---|
| EP | 1 666 119 A1 | 6/2006 |
| JP | 62-40061 | 8/1987 |
| JP | 2-311361 | 12/1990 |
| JP | 8-5710 | 1/1996 |
| JP | 8-290963 | 11/1996 |
| JP | 2002-145659 | 5/2002 |
| JP | 3489030 | 11/2003 |
| WO | 01/37971 | 5/2001 |

OTHER PUBLICATIONS

Buscaglia et al (Journal of Material Science, 1996, 31:5009-5016).*

L. Giordano, et al. "Microstructure and Thermal Expansion of $Al_2TiO_5$-$MgTi_2O_5$ Solid Solutions Obtained by Reaction Sintering", Journal of the European Ceramic Society, XP-004355160, vol. 22, No. 11, Oct. 2002, pp. 1811-1822.

Y.X. Huang, et al. "Thermal and Mechanical Properties of Aluminum Titanate-Mullite Composites", Journal of Materials Research, XP-002428334, vol. 15, No. 2, Feb. 2000, pp. 357-363.

U.S. Appl. No. 10/559,337, filed Dec. 5, 2005, Fukuda, et al.

U.S. Appl. No. 10/568,972, filed Feb. 22, 2006, Fukuda, et al.

Office Action issued Mar. 18, 2011, in Korea Patent Application No. 10-2005-7023260 (with English translation).

* cited by examiner

HONEYCOMB CARRIER FOR EXHAUST GAS CLARIFICATION CATALYST AND METHOD FOR PRODUCTION THEREOF

TECHNICAL FIELD

The present invention relates to a carrier to support a catalyst to clean various exhaust gases particularly an exhaust gas of an automobile containing NOx, and a process for its production.

BACKGROUND ART

The chief characteristics required of a honeycomb carrier to support a catalyst to be used for an apparatus for cleaning an automobile exhaust gas which is particularly widely used at present among various apparatuses for cleaning an exhaust combustion gas, are sol-called heat resistance and thermal shock resistance. A high heat resistance is required since the honeycomb carrier will be exposed to a high temperature of 850° C. or higher by sudden heat generation due to a catalytic oxidation reaction of unburned hydrocarbons or carbon monoxide in the exhaust gas. Further, the thermal shock resistance is a quality to be resistant to cracks or breakage by a thermal stress caused in the honeycomb due to a temperature increase by such sudden heat generation. With respect to the thermal shock resistance, the smaller the thermal expansion coefficient, the greater the endurance temperature difference.

So as to meet such requirements as heat resistance and thermal shock resistance, various ceramics have been proposed as a material for a honeycomb carrier, but a cordierite material has been chiefly used. The primary reason why a cordierite material is used is that cordierite has a so high thermal resistance as 1,400° C., and it has an extremely small thermal expansion coefficient and high thermal shock resistance among ceramics as well.

However, although a cordierite material as a material for a honeycomb carrier has rather excellent quality with respect to heat resistance and thermal shock resistance, it is highly disadvantageous when used as a catalyst carrier for cleaning an exhaust gas containing a nitrogen oxide (NOx), the removal of which is urgently required from an environmental viewpoint. That is, usually a catalyst containing an alkali metal or alkaline earth metal component is used as a catalyst to remove NOx in the exhaust gas. In such a case, a part of the alkali metal or alkaline earth metal is infiltrated into cordierite as a carrier and reacts with cordierite at a high temperature, and such leads to a deterioration of cordierite and loss of the catalyst as well, and thus causes a decrease of removal of NOx in the exhaust gas. In order to prevent such a phenomenon, a method of covering the surface of the catalyst with silica ($SiO_2$), and the like, have been proposed, but an extra step will be required, and an increase in the cost will be inevitable.

On the other hand, in a system wherein a fuel is directly jetted into an engine or in a system wherein a fuel is diluted and burned, which is becoming the main stream of a burning system of an automobile in recent years from a viewpoint of improvement in mileage and from an environmental viewpoint, removal of NOx in the exhaust gas is a particularly important concern as compared with removal of hydrocarbons and carbon monoxide. Accordingly, as a material for a honeycomb carrier to support a catalyst to clean an exhaust gas, a material which replaces cordierite has been strongly desired.

As materials other than cordierite, WO01/037971 discloses ceramics such as silicon carbide, silicon nitride, mullite, aluminum titanate and lithium aluminum silicate. However, they are all insufficient as a material for the honeycomb carrier. That is, silicon nitride, mullite, etc. have a high thermal expansion coefficient and are poor in thermal shock resistance. Further, silicon nitride, lithium aluminum silicate, etc. are insufficient in view of heat resistance.

Aluminum titanate has excellent stability even at a high temperature exceeding 1,700° C., an extremely small thermal expansion coefficient and excellent thermal shock resistance. However, it has such a drawback as small mechanical strength since the anisotropy of its crystal structure is significant, whereby slip is likely to occur at the crystalline interface by a thermal stress. Resultingly, a honeycomb having a small wall thickness and a high cell density is hardly produced with it, and its use as a carrier for an exhaust gas-cleaning catalyst to which a load of mechanical vibration will be applied at a high temperature, tends to be difficult. Further, such aluminum titanate, etc usually have decomposition points within a temperature range of from 800 to 1,280° C., and they can not be used continuously for a long time in a region including such a temperature range.

DISCLOSURE OF THE INVENTION

The present invention provides a honeycomb carrier which is a carrier to support a catalyst to clean particularly an exhaust gas of an automobile containing NOx, which is excellent in heat resistance, thermal shock resistance, mechanical strength and thermal decomposition resistance and has corrosion resistance against a catalyst containing an alkali component, and which is thereby excellent in durability so that it will not deteriorate even in a long term use, and a process for its production.

In order to solve the above problems, the present inventors have conducted extensive studies on aluminum magnesium titanate and aluminum titanate and as a result, made the following discoveries. That is, a sintered product obtained by firing a mixture comprising a mixture comprising a Ti-containing compound, an Al-containing compound and a Mg-containing compound in a predetermined ratio to form aluminum magnesium titanate, or a mixture comprising a Ti-containing compound and an Al-containing compound in a predetermined ratio to form aluminum titanate, and a specific alkali feldspar, an oxide of a spinel structure containing Mg, or MgO or a Mg-containing compound which can be converted to MgO by firing added in a predetermined ratio, is very excellent as a carrier to support a catalyst to clean an exhaust gas of an automobile.

Accordingly, it has been found that a honeycomb carrier made of the above sintered product of the present invention has high heat resistance and thermal shock resistance attributable to low thermal expansion properties and further has high mechanical strength and high thermal decomposition resistance as different from a conventional aluminum magnesium titanate sintered product or aluminum titanate sintered product, and that the sintered product can be used with stability for a long period of time without deterioration as a conventional cordierite material, even when a catalyst containing an alkali metal or alkaline earth metal component is used as a catalyst for removal of NOx.

The present invention has been accomplished on the basis of these discoveries and provides the following:

(1) A honeycomb carrier for an exhaust gas-cleaning catalyst which is a honeycomb carrier to support a catalyst to clean an exhaust gas, characterized in that the material for the honeycomb carrier is an aluminum magnesium titanate sintered product obtained by firing at from 1,000 to 1,700° C. a mixture comprising 100 parts by mass, as calculated as oxides, of a mixture comprising a Mg-containing compound, an Al-containing compound and a Ti-containing compound in the same metal component ratio as the metal component ratio of Mg, Al and Ti in an aluminum magnesium titanate represented by the empirical formula $Mg_xAl_{2(1-x)}Ti_{(1+x)}O_5$ (wherein 0<x<1), and from 1 to 10 parts by mass of an alkali feldspar represented by the empirical formula $(Na_yK_{1-y})AlSi_3O_8$ (wherein 0≤y≤1)

(2) A honeycomb carrier for an exhaust gas-cleaning catalyst which is a honeycomb carrier to support a catalyst to clean an exhaust gas, characterized in that the material for the honeycomb carrier is an aluminum titanate sintered product obtained by firing at from 1,250 to 1,700° C. a raw material mixture comprising 100 parts by mass of a mixture (hereinafter referred to as component X) comprising $TiO_2$ and $Al_2O_3$ in a molar ratio of the former/the latter being 40 to 60/60 to 40, and from 1 to 10 parts by mass of an alkali feldspar represented by the empirical formula $(Na_yK_{1-y})AlSi_3O_8$ (wherein 0≤y≤1), an oxide of a spinel structure containing Mg, or MgO or a Mg-containing compound which can be converted to MgO by firing (hereinafter referred to as component Y).

(3) The honeycomb carrier according to the above (2), wherein the component Y is a mixture comprising an alkali feldspar represented by $(Na_yK_{1-y})AlSi_3O_8$ (wherein 0≤y≤1), and an oxide of a spinel structure containing Mg and/or MgO or a Mg-containing compound which can be converted to MgO by firing.

(4) The honeycomb carrier according to any one of the above (1) to (3), which has a wall thickness of from 0.05 to 0.6 mm, a cell density of from 15 to 124 cells/cm$^2$, a porosity of the partition wall of from 20 to 50%, and a thermal expansion coefficient of at most $3.0 \times 10^{-6} K^{-1}$.

(5) The honeycomb carrier according to any one of the above (1) to (4), wherein the catalyst contains an alkali metal or alkaline earth metal component to remove NOx in the exhaust gas.

(6) The honeycomb carrier according to any one of the above (1) to (5), wherein the exhaust gas is an exhaust gas of an automobile of a system wherein a fuel is directly jetted into an engine or of a system wherein a fuel is diluted and burned.

(7) A process for producing a honeycomb carrier for an exhaust gas-cleaning catalyst, characterized by preparing a raw material mixture comprising 100 parts by mass, as calculated as oxides, of a mixture comprising a Mg-containing compound, an Al-containing compound and a Ti-containing compound in the same metal component ratio as the metal component ratio of Mg, Al and Ti in an aluminum magnesium titanate represented by the empirical formula $Mg_xAl_{2(1-x)}Ti_{(1+x)}O_5$ (wherein 0<x<1), and from 1 to 10 parts by mass of an alkali feldspar represented by the empirical formula $(Na_yK_{1-y})AlSi_3O_8$ (wherein 0≤y≤1), adding a molding assistant to the raw material mixture, followed by kneading to plasticize the raw material mixture to make it extrusion-processable, and then extrusion processing it into a honeycomb body, followed by firing at from 1,000 to 1,700° C.

(8) A process for producing a honeycomb carrier for an exhaust gas-cleaning catalyst, characterized by preparing a mixture comprising 100 parts by mass of a mixture (hereinafter referred to as component X) comprising $TiO_2$ and $Al_2O_3$ in a molar ratio of the former/the latter being 40 to 60/60 to 40, and from 1 to 10 parts by mass of an alkali feldspar represented by the empirical formula $(Na_yK_{1-y})AlSi_3O_8$ (wherein 0≤y≤1), an oxide of a spinel structure containing Mg, or MgO or a Mg-containing compound which can be converted to MgO by firing (hereinafter referred to as component Y), adding a molding assistant to the mixture, followed by kneading to plasticize the mixture to make it extrusion-processable, and extrusion processing it into a honeycomb body, followed by firing at from 1,250 to 1,7000° C.

(9) The process for producing a honeycomb carrier for an exhaust gas-cleaning catalyst according to the above (7) or (8), wherein the average particle size of each component contained in the raw material mixture is at most 10 μm.

(10) A method for cleaning an exhaust gas, which comprises contacting the exhaust gas to a honeycomb carrier supporting a catalyst to clean an exhaust gas, characterized in that the material for the honeycomb carrier is an aluminum magnesium titanate sintered product obtained by firing at from 1,000 to 1,700° C. a mixture comprising 100 parts by mass, as calculated as oxides, of a mixture comprising a Mg-containing compound, an Al-containing compound and a Ti-containing compound in the same metal component ratio as the metal component ratio of Mg, Al and Ti in an aluminum magnesium titanate represented by the empirical formula $Mg_xAl_{2(1-x)}Ti_{(1+x)}O_5$ (wherein 0<x<1), and from 1 to 10 parts by mass of an alkali feldspar represented by the empirical formula $(Na_yK_{1-y})AlSi_3O_8$ (wherein 0≤y≤1)

(11) A method for cleaning an exhaust gas, which comprises contacting the exhaust gas to a honeycomb carrier supporting a catalyst to clean an exhaust gas, characterized in that the material for the honeycomb carrier is an aluminum titanate sintered product obtained by firing at from 1,250 to 1,700° C. a raw material mixture comprising 100 parts by mass of a mixture (hereinafter referred to as component X) comprising $TiO_2$ and $Al_2O_3$ in a molar ratio of the former/the latter being 40 to 60/60 to 40, and from 1 to 10 parts by mass of an alkali feldspar represented by the empirical formula $(Na_yK_{1-y})AlSi_3O_8$ (wherein 0≤y≤1), an oxide of a spinel structure containing Mg, or MgO or a Mg-containing compound which can be converted to MgO by firing (hereinafter referred to as component Y).

Effects of the Invention

The honeycomb carrier of the present invention has high heat resistance and thermal shock resistance attributable to low thermal expansion properties and further, has high mechanical strength and excellent thermal decomposition resistance as different from a conventional aluminum magnesium titanate sintered product or aluminum titanate sintered product, and is further excellent in corrosion resistance against a catalyst, Resultingly, it is useful as a carrier to support a catalyst to clean any exhaust gas from a combustion source of either a stationary body or a mobile body, particularly an exhaust gas of an automobile containing NOx.

The reason why the honeycomb carrier of the present invention has high heat resistance and thermal shock resistance and further has excellent mechanical strength and thermal decomposition resistance, and does not deteriorate even when used as a carrier for a catalyst containing an alkali metal component to clean an exhaust gas containing NOx, is not necessarily clearly understood. However, the following reasons are estimated, respectively, in a case where the honeycomb carrier of the present invention is made of an aluminum magnesium titanate sintered product and a case where the honeycomb carrier of the present invention is made of an aluminum titanate sintered product.

(A) In a case where the honeycomb carrier of the present invention is made of an aluminum magnesium titanate sintered product, the crystals of aluminum magnesium titanate as the basic structure are formed in a state where, by the presence of an alkali feldspar in their production process, the alkali feldspar becomes a liquid phase, whereby dense crystals will be formed, and the mechanical strength will be improved. And, the Si component contained in the alkali feldspar will be solid-solubilized in the crystal lattice of aluminum magnesium titanate when aluminum magnesium titanate is formed by firing, and as the Si solid-solubilization state, two types, i.e. Si having a coordination number of 6 and solid-solubilized in the interior of the crystal grains and Si having a coordination number of 4 and solid-solubilized at the surface portion of the crystal grains, are considered. This is confirmed also by results by NMR (nuclear magnetic resonance) measurement such that Si in the aluminum magnesium titanate crystals is present in two states of one having a coordination number of 6 and one having a coordination number of 4.

Namely, Si to be solid-solubilized in the interior of the crystal grains of aluminum magnesium titanate has a coordination number of 6 and is tetravalent, and will form a pair with bivalent Mg which also has a coordination number of 6 so that the pair will be sexivalent in total and will be substituted for adjacent two trivalent Al (sexivalent in total having a coordination number of 6). The reason for this will be explained from the correlation of ionic radii in addition to the maintained balance of electrical charge. That is, the ionic radii of $Si^{4+}$ and $Mg^{2+}$ are 0.54 Å and 0.86 Å, respectively. The average ionic radius of the two will be 0.70 Å which is close to 0.68 Å i.e. the ionic radius of $Al^{3+}$, whereby the occupation of two $Al^{3+}$ by the pair of $Si^{4+}$ and $Mg^{2+}$ will be in a solid solution state which is more stable from the viewpoint of energy. Thus, it is considered that by the simultaneous presence of Si and Mg, diffusion of ions among the respective cations in aluminum magnesium titanate can be suppressed even at a high temperature, and a stable crystal structure can be secured, whereby excellent thermal decomposition resistance will be obtained.

On the other hand, Si to be solid-solubilized at the surface portion of the crystal grains of aluminum magnesium titanate has a coordination number of 4 not 6. This is considered to be because Si at the surface portion has a coordination number of 4, to which oxygen is more stably bonded, since the number of cations with which oxygen is shared, which are so-called counterparts, is small. Accordingly, Si to be solid-solubilized at the surface portion of the crystal grains is in a state of mimetically coating the crystals of aluminum magnesium titanate. Thus, it is considered that the honeycomb carrier of the present invention, even when used as a carrier for a catalyst containing an alkali metal, has excellent corrosion resistance against erosion of the carrier by an alkali component at a high temperature, whereby it will not deteriorate even in a long term use.

(B) In a case where the honeycomb carrier of the present invention is made of an aluminum titanate sintered product, by incorporation of an alkali feldspar to the mixture for forming aluminum titanate, the alkali feldspar which becomes a liquid phase in the vicinity of the temperature for forming aluminum titanate is present, and thus the reaction for forming aluminum titanate will take place in the liquid phase, whereby dense crystals will be formed, and the mechanical strength will be improved. And, the Si component contained in the alkali feldspar will be solid-solubilized in the crystal lattice of aluminum titanate and substitute for Al. Si has a smaller ionic radius than Al, whereby the bond length with surrounding oxygen atoms is shorter, and the lattice constant tends to be small as compared with pure aluminum titanate. Accordingly, it is considered that the sintered product to be obtained will have a stabilized crystal structure and exhibit very high thermal stability, and have significantly improved thermal decomposition resistance.

Further, when an oxide of a spinel structure containing Mg, or MgO or a Mg-containing compound which can be converted to MgO by firing is added to the mixture forming aluminum titanate, a dense sintered product will be obtained, and a sintered product having very high mechanical strength as compared with pure aluminum titanate will be formed.

Still further, when an alkali feldspar, and an oxide of a spinel structure and/or MgO or a Mg-containing compound which can be converted to MgO by firing are simultaneously added to the mixture forming aluminum titanate, Si contained in the alkali feldspar and Mg contained in the oxide of a spinel structure and MgO or the Mg-containing compound which can be converted to MgO by firing, will be substituted for mainly Al sites in aluminum titanate. When such elements are added by themselves, a bivalent (Mg) or tetravalent (Si) element will be substituted for Al sites where a fundamentally trivalent electrical charge balance is maintained. Accordingly, it is considered that so as to maintain the electrical charge balance, when Mg is added, oxygen is discharged out of the system to cause an oxygen defect to maintain the electrical charge balance, and when Si is added, as Si is tetravalent, fundamentally tetravalent Ti is reduced to trivalent to maintain the electrical charge balance.

On the other hand, Mg has an electrical charge smaller by 1 than Al and Si has an electrical charge larger by 1 than Al. Accordingly, it is considered that the electrical charge balance can be maintained by simultaneously adding the alkali feldspar and the oxide of a spinel structure and MgO or the Mg-containing compound which can be converted to MgO by firing, whereby Si can be solid-solubilized without influence over other sintered product-constituting elements.

Particularly, in such a case, it is considered that when the alkali feldspar, the oxide of a spinel structure and MgO or the Mg-containing compound which can be converted to MgO by firing are added in a ratio close to an equimolar ratio, the additives can be present more stably as compared with a case where they are added by themselves. It is considered that from these reasons, they synergistically function, whereby an aluminum titanate sintered product, which has significantly improved strength as compared with a case where the additives are used by themselves, low thermal expansion properties which aluminum titanate fundamentally has, and high mechanical strength, and yet has improved thermal decomposition resistance, will be formed.

Further, the reason why the honeycomb carrier of the present invention has excellent corrosion resistance against a catalyst containing an alkali component is estimated as follows. Firstly, in the case of a honeycomb carrier made of aluminum titanate obtained by firing a raw material mixture containing an alkali feldspar, when aluminum titanate is formed, the potassium component contained in the alkali feldspar has been already present outside the aluminum titanate crystal system (present at the crystalline interface). Accordingly, when a catalyst containing an alkali component is supported so that the alkali component is in contact with the honeycomb carrier, the osmotic pressure of potassium to the honeycomb carrier tends to be low, and resultingly infiltration of potassium into the carrier will be inhibited.

On the other hand, in the case of aluminum titanate obtained by firing a raw material mixture containing an oxide of a spinel structure containing Mg, or MgO or a Mg-containing compound which can be converted to MgO by firing, by the presence of a Mg (one of alkaline earth metals) component which is a basic element, the aluminum titanate sintered product tends to have a decreased acidity, whereby its reactivity with the alkali component which is a base (one of alkali metals) in the catalyst tends to be low.

Further, in the case of aluminum titanate obtained by firing a raw material mixture containing both an alkali feldspar, and an oxide of a spinel structure containing Mg, or MgO or a Mg-containing compound which can be converted to MgO by firing, it is considered that both the above mechanisms will synergistically function, whereby very excellent corrosion resistance against an alkali component will be achieved.

BEST MODE FOR CARRYING OUT THE INVENTION

Figure 1:
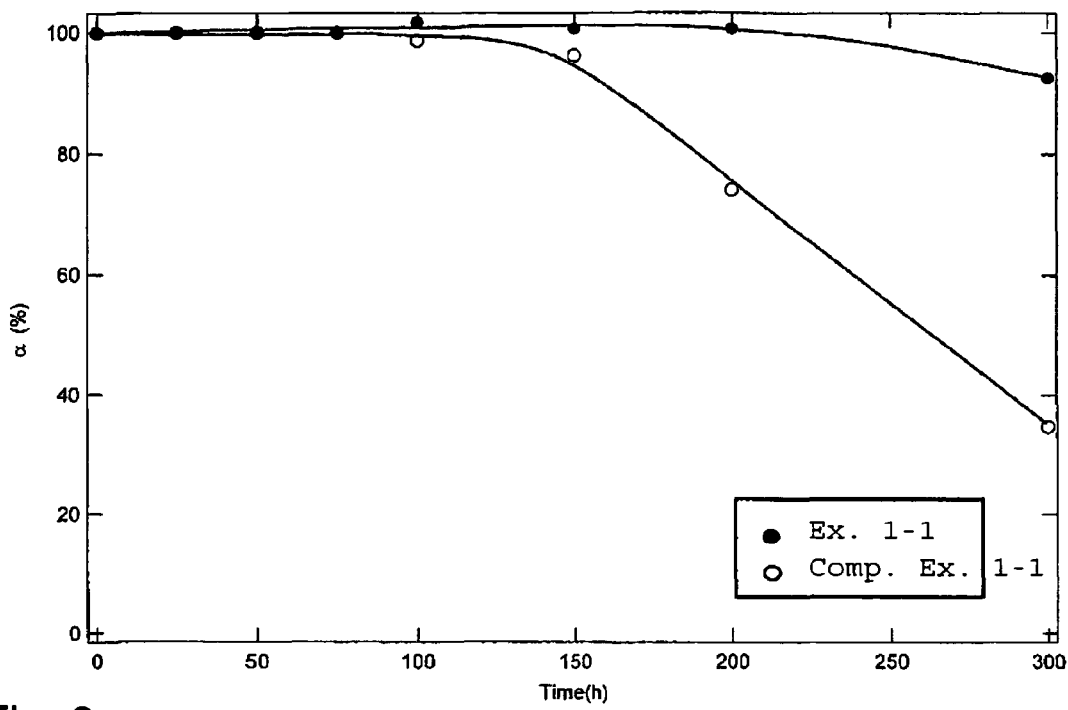
FIG. 1 shows the changes with time of the remaining ratios α of aluminum magnesium titanate with respect to the sintered products in Example 1-1 of the present invention and Comparative Example 1-1.

In the present invention, as the material for the honeycomb structure catalyst carrier, the following aluminum magnesium titanate sintered product (A) or aluminum titanate sintered product (B) is used.

(A): Aluminum Magnesium Titanate Sintered Product

An aluminum magnesium titanate sintered product obtained by firing at from 1,000 to 1,700° C. a raw material mixture comprising 100 parts by mass, as calculated as oxides, of a mixture comprising a Mg-containing compound, an Al-containing compound and a Ti-containing compound in the same metal component ratio as the metal component ratio of Mg, Al and Ti in an aluminum magnesium titanate represented by the empirical formula $Mg_xAl_{2(1-x)}Ti_{(1+x)}O_5$ (wherein $0<x<1$), and from 1 to 10 parts by mass of an alkali feldspar represented by the empirical formula $(Na_yK_{1-y})AlSi_3O_8$ (wherein $0\leq y\leq 1$).

The above Mg-containing compound, Al-containing compound and Ti-containing compound to be used as the raw materials, are not particularly limited so long as they are components capable of synthesizing aluminum magnesium titanate by firing. The Mg-containing compound, Al-containing compound and Ti-containing compound may not necessarily be separate compounds respectively, and may be a compound containing two or more metal components. Such raw material compounds may usually be suitably selected among those to be used as raw materials for various ceramics, such as alumina ceramics, titania ceramics, magnesia ceramics, aluminum titanate ceramics, magnesium titanate ceramics, spinel ceramics and aluminum magnesium titanate ceramics. Specific examples of such compounds include oxides such as $Al_2O_3$, $TiO_2$ and MgO, composite oxides containing at least two types of metal components, such as $MgAl_2O_4$, $Al_2TiO_5$, $MgTi_2O_5$, and various spinel structures containing Mg and Ti, compounds containing one or more metal components selected from the group consisting of Al, Ti and Mg (such as carbonates, nitrates or sulfates).

The blend ratio of the Mg-containing compound, the Al-containing compound and the Ti-containing compound is such that the ratio of the metal components contained in these compounds would be a ratio similar to, preferably the same ratio as, the metal component ratio of Mg, Al and Ti in aluminum magnesium titanate represented by the above empirical formula $Mg_xAl_{2(1-x)}Ti_{(1+x)}O_5$ (wherein $0<x<1$). By using the above respective compounds as mixed in such a ratio, it is possible to obtain aluminum magnesium titanate having the same metal component ratio as the metal component ratio in the mixture used as the raw material.

When a honeycomb filter of the present invention is to be obtained, it is necessary to incorporate an alkali feldspar as an additive to the above-mentioned mixture comprising the Mg-containing compound, the Al-containing compound and the Ti-containing compound. The alkali feldspar not only serves as a sintering assistant for aluminum magnesium titanate, but also plays a role of adding a Si component to the aluminum magnesium titanate, and it is represented by the empirical formula $(Na_yK_{1-y})AlSi_3O_8$. In the formula, y satisfies $0\leq y\leq 1$, preferably $0.1\leq y\leq 1$, particularly preferably $0.15\leq y\leq 0.85$. An alkali feldspar having value y within this range, has a low melting point and is particularly effective for promoting the sintering of aluminum magnesium titanate.

The amount of the alkali feldspar to be used, is usually from about 1 to 10 parts by mass, preferably from about 3 to about 5 parts by mass, per 100 parts by mass of the total amount of the Mg-containing compound, the Al-containing compound and the Ti-containing compound to be used as the raw materials, as calculated as the respective oxides. In such a case, the total amount of the raw material mixture as calculated as oxides, is the mass after carrying out heat treatment to remove moisture or organic substances contained in the above raw material mixture, or when presintering is carried out, the mass is before the main firing after the presintering.

To the raw material mixture having an alkali feldspar added to the mixture comprising the Mg-containing compound, the Al-containing compound and the Ti-containing compound, other sintering assistants may be added, if necessary, whereby the nature of the sintered product thereby obtainable, can be improved. As such other sintering assistants, $SiO_2$, $ZrO_2$, $Fe_2O_3$, CaO and $Y_2O_3$ may, for example, be mentioned.

The above raw material mixture is thoroughly mixed and pulverized. The mixing and pulverization of the raw material mixture are not particularly limited and can be carried out by known methods. For example, they may be carried out by means of a ball mill, a medium-stirring mill, etc. The pulverization degree of the raw material mixture is not particularly limited, but the average particle size is preferably at most 10 µm, particularly preferably from 1 to 5 µm. The smaller the average particle size of the raw material mixture, the better, so long as it is within a range where no secondary particles will be formed.

Molding assistants may preferably be incorporated to the raw material mixture. As such molding assistants, known agents such as a binder, a pore-forming agent, a release agent, a defoaming agent and a peptizer may be employed. As the binder, polyvinyl alcohol, microwax emulsion, methylcellulose or carboxymethylcellulose may, for example, be preferred. As the pore-forming agent, activated carbon, coke, a polyethylene resin, starch or graphite may, for example, be preferred. As the release agent, a stearic acid emulsion may, for example, be preferred; as the defoaming agent, n-octyl alcohol or octylphenoxyethanol may, for example, be preferred; and as the peptizer, diethylamine or triethylamine may, for example, be preferred.

The amounts of the molding assistants are not particularly limited. However, in the case of the present invention, they are preferably within the following ranges, respectively, as calculated as solid contents, per the total content of 100 parts by mass of the Mg-containing compound, the Al-containing compound and the Ti-containing compound to be used as the raw materials, as calculated as the respective oxides. Namely, it is preferred to use the binder in an amount of from about 0.2 to about 0.6 part by mass, the pore-forming agent in an amount of from about 20 to about 50 parts by mass, the release agent in an amount of from about 0.2 to about 0.7 part by mass, the defoaming agent in an amount of from about 0.5 to about 1.5 parts by mass and the peptizer in an amount of from about 0.5 to about 1.5 parts by mass.

The raw material mixture having such molding assistants incorporated, is mixed, kneaded and plasticized so that it is extrusion-processable, followed by extrusion processing to form a honeycomb body. As the method for extrusion, a known method may be used, and the cross-sectional shape of each cell of the honeycomb may be circular, oval, tetragonal or triangular. Further, the entire configuration of the honeycomb body may be either cylindrical or square tubular. The molded honeycomb is preferably dried and then fired at from 1,000 to 1,700° C., preferably from 1,250 to 1,450° C. The firing atmosphere is not particularly limited and is preferably an oxygen-containing atmosphere such as in the air which is commonly employed. The firing time is not particularly limited so long as the firing can be done until the sintering proceeds sufficiently, and it is usually at a level of from 1 to 20 hours.

Also with respect to the temperature raising rate or the temperature lowering rate at the time of the above firing, there is no particular restriction, and such conditions may be suitably set so that no cracks will be formed in the obtainable sintered product. For example, it is preferred to gradually raise the temperature without rapid rise of the temperature to sufficiently remove moisture, the molding assistants such as a binder, etc. contained in the raw material mixture. Further, if necessary, prior to heating at the above-mentioned firing temperature, presintering may be carried out preferably within a temperature range of from 500 to 1,000° C. for from 10 to 30 hours by mild temperature raise, whereby the thermal stress in the sintered product during the formation of aluminum magnesium titanate, can be relaxed, and formation of cracks in the sintered product can be suppressed.

The sintered product thus obtainable will be aluminum magnesium titanate represented by the empirical formula $MgxAl_{2(1-x)}Ti_{(1+x)}O_5$ (wherein $0<x<1$) wherein the Si component contained in an alkali feldspar is solid-solubilized in the crystal lattice of aluminum magnesium titanate. Such a sintered product has high heat resistance and high thermal shock resistance and yet has a crystal structure stabilized, as mentioned above, and will thus be a sintered product having excellent mechanical strength and high heat decomposition resistance.

(B): Aluminum Titanate Sintered Product

An aluminum titanate sintered product obtained by firing at from 1,250 to 1,700° C. a raw material mixture comprising 100 parts by mass of the component X comprising $TiO_2$ and $Al_2O_3$ in a molar ratio of the former/the latter being 40 to 60/60 to 40, and from 1 to 10 parts by mass of the component Y.

The above $TiO_2$ and $Al_2O_3$ to be used for forming aluminum titanate may not necessarily be pure $TiO_2$ and $Al_2O_3$, respectively, and they are not particularly limited so long as they are components capable of synthesizing aluminum titanate by firing. Such components may usually be suitably selected among those to be used as raw materials for various ceramics, such as alumina ceramics, titania ceramics and aluminum titanate ceramics. For example, a composite oxide, a carbonate, a nitrate and a sulfate containing Al and Ti as metal components may also be used.

$TiO_2$ and $Al_2O_3$ are used in a molar ratio of the former/the latter of 40 to 60/60 to 40, preferably 45 to 50/55 to 50. Particularly, when the molar ratio of $Al_2O_3/TiO_2$ is 1 or above within the above range, the eutectic point of the sintered product can be avoided. In the present invention, $Al_2O_3$ and $TiO_2$ are used as a mixture, and they will sometimes be collectively referred to as component X.

In the case of the honeycomb carrier of the present invention, it is necessary to add, in addition to the above component X, the component Y as an additive. As the alkali feldspar which is one member of the component Y, one represented by the empirical formula $(Na_yK_{1-y})AlSi_3O_8$ is used. In the formula, y satisfies $0 \leq y \leq 1$, preferably $0.1 \leq y \leq 1$, particularly preferably $0.15 \leq y \leq 0.85$. An alkali feldspar having value y within this range, has a low melting point and is particularly effective for promoting the sintering of aluminum titanate.

As the oxide of a spinel structure containing Mg which is another member of component Y, $MgAl_2O_4$ or $MgTi_2O_4$ may, for example, be used. Such an oxide of a spinel structure may be a natural mineral, or a substance containing MgO and $Al_2O_3$, a substance containing MgO and $TiO_2$ or an oxide of a spinel structure obtained by firing such a substance. Further, a mixture of two or more oxides of different spinel structures may be used. Further, the MgO precursor is not limited so long as it is capable of synthesizing MgO by firing, and it may, for example, be $MgCO_3$, $Mg(NO_3)_2$, $MgSO_4$ or a mixture thereof.

The proportions of the component X and the component Y are important. From 1 to 10 parts by mass of the component Y is used per 100 parts by mass of the component X. These proportions are proportions as oxides of the components X and Y, respectively, and if a raw material other than an oxide is used, the proportion is calculated as an oxide. If the proportion of the component Y per 100 parts by mass of the component X is smaller than 1 part by mass, the effect by addition of the component Y will be insufficient to improve characteristics of the sintered product. On the other hand, if it exceeds 10 parts by mass, the amount of the Si or Mg element will be considerably in excess of the limit of solid-solubilization in the aluminum titanate crystals, whereby the excessive added surplus component will be present as an oxide by itself in the sintered product, which may lead to a significant increase in the thermal expansion coefficient. The proportion of the component Y per 100 parts by mass of the component X is particularly preferably from 3 to 7 parts by mass.

In the present invention, it is preferred to use as the component Y a mixture of an alkali feldspar represented by the empirical formula $(Na_yK_{1-y})AlSi_3O_8$, and an oxide of a spinel structure containing Mg and/or MgO or its precursor, in combination. When such a mixture is used, the above synergistic improvement of functions will be achieved. In the mixture of an alkali feldspar, and an oxide of a spinel structure containing Mg and/or MgO or its precursor, the mass ratio of the former/the latter is preferably 20 to 60/80 to 40, particularly preferably 35 to 45/65 to 55. Within the above range, Si/Mg are present in an equimolar ratio, and out of this range, synergistic effects by simultaneous solid-solubilization of Si and Mg in aluminum titanate will hardly be obtained.

In the present invention, in addition to the above components X and Y, if necessary, other sintering assistants may be used, whereby the nature of the sintered product thereby obtainable, can be improved. As such other sintering assistants, $SiO_2$, $ZrO_2$, $Fe_2O_3$, CaO or $Y_2O_3$ may, for example, be mentioned.

The raw material mixture comprising the components X and Y is thoroughly mixed and pulverized. The mixing and pulverization of the raw material mixture are not particularly limited and can be carried out by known methods. For example, they may be carried out by means of a ball mill, a medium-stirring mill, etc. The pulverization degree of the raw material mixture is not particularly limited, but the average particle size is preferably at most 30 μm, particularly preferably from 8 to 15 μm. The smaller the average particle size, the better, so long as it is within a range where no secondary particles will be formed.

The amounts of molding assistants are not particularly limited. However, in the case of the present invention, they are preferably within the following ranges, respectively, as calculated as solid contents, per the total content of 100 parts by mass of the component X and the component Y (as calculated as oxides) to be used as the raw materials. Namely, it is preferred to use a binder in an amount of from about 0.2 to about 0.6 part by mass, a pore-forming agent in an amount of from about 20 to about 50 parts by mass, a release agent in an amount of from about 0.2 to about 0.7 part by mass, a defoaming agent in an amount of from about 0.5 to about 1.5 parts by mass and a peptizer in an amount of from about 0.5 to about 1.5 parts by mass.

The raw material mixture having such molding assistants incorporated, is mixed, kneaded and plasticized so that it is extrusion-processable, followed by extrusion processing to form a honeycomb body. As the method for extrusion, a known method may be used, and the cross-sectional shape of each cell of the honeycomb may be circular, oval, tetragonal or triangular. Further, the entire configuration of the honeycomb body may be either cylindrical or square tubular. The molded honeycomb is preferably dried and then fired at from 1,250 to 1,700° C., preferably from 1,300 to 1,450° C. The firing atmosphere is not particularly limited and is preferably an oxygen-containing atmosphere such as in the air which is commonly employed. The firing time is not particularly limited so long as the firing can be done until the sintering proceeds sufficiently, and it is usually at a level of from 1 to 20 hours.

Also with respect to the temperature raising rate or the temperature lowering rate at the time of the above firing, there is no particular restriction, and such conditions may be suitably set so that no cracks will be formed in the obtainable sintered product. For example, it is preferred to gradually raise the temperature without rapid rise of the temperature to sufficiently remove moisture, the molding assistants such as a binder, etc. contained in the raw material mixture. Further, if necessary, prior to heating at the above-mentioned firing temperature, presintering may be carried out preferably within a temperature range of from 500 to 1,000° C. for from 10 to 30 hours by mild temperature raise, whereby the thermal stress in the sintered product during the formation of aluminum titanate, can be relaxed, and formation of cracks in the sintered product can be suppressed.

The sintered product thus obtainable will be aluminum titanate formed from the component X wherein the Si component contained in an alkali feldspar and the Mg component derived from an oxide of a spinel structure containing Mg, MgO or a Mg-containing compound which can be converted to MgO by firing, as the component Y, are solid-solubilized in the crystal lattice of aluminum titanate. Such a sintered product has high mechanical strength and a low thermal expansion coefficient and yet has a crystal structure stabilized as mentioned above, and will thus be a sintered product having excellent thermal decomposition resistance.

A honeycomb body made of the above aluminum magnesium titanate sintered product (A) or aluminum titanate sintered product (B) has a thin wall honeycomb structure having a wall thickness of e.g. from 0.05 to 0.6 mm and a cell density of e.g. from 15 to 124 cells/cm$^2$. And, the porosity of the partition wall is e.g. from 20 to 50%, and the thermal expansion coefficient is e.g. at most $3.0 \times 10^{-6} K^{-1}$. Such a honeycomb body can be used with stability, at from room temperature to such a high temperature as above 1,600° C. as the thermal decomposition reaction of aluminum magnesium titanate or aluminum titanate is suppressed.

The honeycomb body is used as a carrier for a catalyst to clean various exhaust gases containing harmful components such as hydrocarbons, carbon monoxide, NOx and SOx, particularly an exhaust gas of an automobile containing NOx. Particularly, the honeycomb carrier of the present invention is stable against an alkali at a high temperature, whereby it is effective against an exhaust gas of an automobile of a system wherein a fuel is directly jetted into an engine or of a system wherein a fuel is diluted and burned, an exhaust gas from which contains NOx at a relatively high concentration.

As a catalyst supported by the carrier, various known catalysts may be used such as a conventional so-called three way catalyst to remove hydrocarbons and carbon monoxide. However, the carrier of the present invention is particularly effective for a catalyst containing an alkali metal or alkaline earth metal component to remove NOx in an exhaust gas. The carrier of the present invention is effective for a catalyst containing potassium or barium effective for removal of NOx, particularly potassium, among alkali metals and alkaline earth metals.

As a method of making the catalyst be supported by the honeycomb body of the present invention, a known means may be employed. When a catalyst is to be supported, a material having a large specific surface area, such as alumina or silica, may be interposed, as the case requires, so as to improve the supporting ratio. That is, alumina or silica may be supported by the honeycomb carrier, and a catalyst is supported by alumina or silica thus supported. The honeycomb body by which a catalyst is supported, is preferably set in an can body by means of a suitable supporting material.

EXAMPLE

Now, the present invention will be described in further detail with reference to Examples. However, it should be understood that the present invention is by no means thereby restricted.

Example 1-1

To 100 parts by mass of a mixture comprising 26.7 mass % (20 mol %) of easily sinterable α-alumina, 62.8 mass % (60 mol %) of anatase-type titanium oxide and 10.5 mass % (20 mol %) of periclase-type magnesium oxide present as a natural mineral, 4 parts by mass of an alkali feldspar represented by $(Na_{0.6}K_{0.4})AlSi_3O_8$, 0.25 part by mass of polyvinyl alcohol as a binder, 1 part by mass of diethylamine as a peptizer, 0.5 part by mass of polypropylene glycol as a defoaming agent, and 35 parts by mass of activated carbon having a particle size of at most 30 μm as a pore-forming agent, were added and mixed for 3 hours in a ball mill and then dried in a dryer at 120° C. for at least 12 hours to obtain a raw material powder.

The obtained raw material powder was pulverized to an average particle size of about 5 μm and extruded by a vacuum extruder (manufactured by Miyazaki Iron Works Co., Ltd.) to obtain a cylindrical honeycomb body having a diameter of 129 mm and a length of 150 mm, and having cross-sectionally square cells with a wall thickness of 0.1 mm and a cell density of 93 cells/cm². This honeycomb body was dried and then fired in the atmosphere at 1,400° C. for 4 hours and then left to cool, to obtain a sintered product.

Comparative Example 1-1

A honeycomb sintered product made of an aluminum magnesium titanate sintered product was obtained in the same manner as in Example 1-1 except that no alkali feldspar was used.

Comparative Example 1-2

A honeycomb having the same shape as that in Example 1-1 was prepared by using as the material for a honeycomb carrier a cordierite powder ($2MgO.2Al_2O_3.5SiO_2$) by a known method.

Property Tests with Respect to Honeycomb Sintered Products

With respect to the honeycomb sintered products obtained in the above Example 1-1 and Comparative Examples 1-1 and 1-2, the porosity (%), the thermal expansion coefficient ($\times 10^{-6} K^{-1}$) at from room temperature to 800° C., the thermal shock resistance (° C.) by an in-water dropping method, the softening temperature (° C.) and the compression strength (MPa) were measured, and the results are shown in Table 1-1. Here, the porosity was measured by a method in accordance with JIS R1634, the thermal expansion coefficient by a method in accordance with JIS R1618, the thermal shock resistance by a method in accordance with JIS R1648, the softening temperature by a method in accordance with JIS R2209, and the compression strength by a method in accordance with JIS R1608. Further, with respect to the compression strength, from each honeycomb sintered product, a square test specimen having cross-sectionally 5×5 cells and a length of 15 mm, was cut out, and this specimen was measured from three directions i.e. (A) in the lengthwise axial direction (axial), (B) in the vertical direction (tangential) and (C) in the direction inclined by 45° from the lengthwise axis (diagonal).

of the diffraction peak at the (110) face of rutile and the integrated intensity ($I_{MAT(023)}$) of the diffraction peak at the (023) face of aluminum magnesium titanate, the intensity ratio R of aluminum magnesium titanate to rutile was obtained by the following formula:

$$R = I_{MAT(023)}/(I_{MAT(023)} + I_{TiO2(110)})$$

Further, also with respect to the sintered product before carrying out the thermal treatment at 1,100° C., the intensity ratio $R_0$ of aluminum magnesium titanate to rutile was obtained in the same manner. Then, using R and $R_0$ obtained as described above, the remaining ratio α (%) of aluminum magnesium titanate was obtained by the following formula:

$$\alpha = (R/R_0) \times 100$$

With respect to the respective sintered products in Example 1-1 and Comparative Example 1-1, the changes with time of the remaining ratio α of aluminum magnesium titanate are shown by a graph in FIG. 1. As is evident from FIG. 1, the sintered product in Example 1-1 is superior in the thermal decomposition resistance, as the remaining ratio α of aluminum magnesium titanate is maintained at α high level over a long time, as compared with the sintered product in Comparative Example 1-1.

Alkali Resistance Test with Respect to Honeycomb Bodies

The following test was carried out to examine the corrosion resistance of the honeycomb bodies against a potassium-containing catalyst which is a catalyst for removal of NOx in an exhaust gas of an automobile. A honeycomb carrier against an exhaust gas of an automobile is used at a temperature of from room temperature to 850° C., and the potassium concentration of the potassium-containing catalyst is not so high. However, in this test, an accelerated test under severe conditions was carried out, which comprises dipping a test specimen in an aqueous potassium nitrate solution at a concentration of 1 mol/liter, drying it and holding it in a furnace maintained at a temperature of 900° C. for a long period of time.

Test Method

From each of the honeycomb bodies in Example 1-1 and Comparative Example 1-2, a test specimen with a 30 mm

TABLE 1-1

| | Porosity (%) | Thermal expansion coefficient ($10^{-6} K^{-1}$) | Thermal shock resistance (° C.) | Softening temperature (° C.) | Compression strength (MPa) | | |
|---|---|---|---|---|---|---|---|
| | | | | | (A) | (B) | (C) |
| Example 1-1 | 34 | 1.0 | 850 | 1580 | >14 | >3 | >2 |
| Comparative Example 1-1 | 35 | 0.2 | 860 | 1600 | >9 | >1.5 | >0.8 |
| Comparative Example 1-2 | 35 | 0.6 | 650 | 1320 | >10 | >1.3 | >0.2 |

Thermal Decomposition Resistance Test

From the honeycomb carrier in Example 1-1, a test specimen of 10 mm×10 mm×10 mm was cut out and held in a high temperature atmosphere of 1,100° C., whereby the change with time of the remaining ratio α (%) of aluminum magnesium titanate was investigated to carry out a thermal decomposition resistance test.

Here, the remaining ratio of aluminum magnesium titanate was obtained by the following method from the spectrum of the X-ray diffraction measurement (XRD).

Firstly, as $MgAl_2O_4$ (spinel) and $TiO_2$ (rutile) are formed when aluminum magnesium titanate undergoes thermal decomposition, by using the integrated intensity ($I_{TiO2(110)}$)

square cross section and a length of 50 mm was cut out, and the test specimen was dipped in an aqueous potassium nitrate solution at a concentration of 1 mol/liter at room temperature for 1 hour, and then dried at 70° C. for 1 hour. The dried honeycomb body was inserted into a tubular furnace with an inner diameter of 5 cm and a length of 42 cm and held for a predetermined time under the following conditions while supplying the air containing 10% of moisture to the tubular furnace at 25 cc/min. Then, the honeycomb body taken out from the tubular furnace was subjected to XRD measurement to examine degeneration of the honeycomb body material. The air containing 10% of moisture to be supplied to the tubular furnace was prepared by making the air pass through a water tank controlled at 60° C. The results of the test are shown in Table 1-2.

Holding Conditions:

Temperature in the furnace: 900° C., temperature-raising and lowering rate of the furnace: 100° C./hr, holding time: 50 hours, 100 hours, 150 hours or 200 hours

TABLE 1-2

| | Holding time | | | |
|---|---|---|---|---|
| | 50 hours | 100 hours | 150 hours | 200 hours |
| Honeycomb body in Example 1-1 | No change | No change | No change | No change |
| Honeycomb body in Comparative Example 1-2 | No change | Peak of KAlSiO$_4$ observed in the vicinity of 2θ = 28° | Peak of KAlSiO$_4$ improved | Peak of KAlSiO$_4$ improved |

As is evident from the results shown in Table 1-2, the honeycomb body in Example 1-1 has a great corrosion resistance to potassium as compared with the honeycomb body in Comparative Example 1-2.

Example 2-1

To 100 parts by mass of a mixture comprising 56.1 mass % (50 mol %) of easily sinterable α-alumina and 43.9 mass % (50 mol %) of anatase-type titanium oxide, 4 parts by mass of an alkali feldspar represented by $(Na_{0.6}K_{0.4})AlSi_3O_8$ as an additive, 0.25 part by mass of polyvinyl alcohol as a binder, 1 part by mass of diethylamine as a peptizer, 0.5 part by mass of polypropylene glycol as a defoaming agent, and 35 parts by mass of activated carbon having a particle size of from 50 to 80 μm as a pore-forming agent, were added and mixed for 3 hours in a ball mill and then dried in a dryer at 120° C. for at least 12 hours to obtain a raw material powder.

The obtained raw material powder was pulverized to an average particle size of about 5 μm and extruded by a vacuum extruder (manufactured by Miyazaki Iron Works Co., Ltd.) to obtain a cylindrical honeycomb body having a diameter of 129 mm and a length of 150 mm, and having cross-sectionally square cells with a wall thickness of 0.1 mm and a cell density of 93 cells/cm$^2$. This honeycomb body was dried and then fired in the atmosphere at 1,400° C. for 4 hours and then left to cool, to obtain a honeycomb body.

Comparative Example 2-1

A honeycomb carrier made of an aluminum titanate sintered product was obtained in the same manner as in Example 2-1 except that no alkali feldspar was used.

Comparative Example 2-2

A honeycomb carrier having the same shape as that in Example 2-1 was prepared by using a cordierite powder $(2MgO.2Al_2O_3.5SiO_2)$ by a known method.

Example 2-2

To 100 parts by mass of a mixture comprising 56.1 mass % (50 mol %) of easily sinterable α-alumina and 43.9 mass % (50 mol %) of anatase-type titanium oxide, 4 parts by mass of an alkali feldspar represented by $(Na_{0.6}K_{0.4})AlSi_3O_8$ and 6 parts by mass of a spinel compound represented by the formula $MgAl_2O_4$ as additives, 0.25 part by mass of polyvinyl alcohol as a binder, 1 part by mass of diethylamine as a peptizer, 0.5 part by mass of polypropylene glycol as a defoaming agent, and 35 parts by mass of activated carbon having a particle size of from 50 to 80 μm as a pore-forming agent, were added and mixed for 3 hours in a ball mill and then dried in a drier at 120° C. for at least 12 hours to obtain a raw material powder.

Using the obtained raw material powder, pulverization, extrusion molding, drying and firing were carried out in the same manner as in Example 2-1 to obtain a honeycomb carrier.

Example 2-3

To 100 parts by mass of a mixture comprising 56.1 mass % (50 mol %) of easily sinterable α-alumina and 43.9 mass % (50 mol %) of anatase-type titanium oxide, 6 parts by mass of a spinel compound represented by the formula $MgAl_2O_4$ as an additive, 0.25 part by mass of polyvinyl alcohol as a binder, 1 part by mass of diethylamine as a peptizer, 0.5 part by mass of polypropylene glycol as a defoaming agent, and 35 parts by mass of activated carbon having a particle size of from 50 to 80 μm as a pore-forming agent, were added and mixed for 3 hours in a ball mill and then dried in a drier at 120° C. for at least 12 hours to obtain a raw material powder.

Using the obtained raw material powder, pulverization, extrusion molding, drying and firing were carried out in the same manner as in Example 2-1 to obtain a honeycomb carrier.

Property Tests with Respect to Honeycomb Sintered Products

With respect to the honeycomb sintered products obtained in the above Examples 2-1, 2-2 and 2-3 and Comparative Examples 2-1 and 2-2, the porosity (%), the thermal expansion coefficient ($\times 0^{-6}$ K$^{-1}$) at from room temperature to 800° C., the thermal shock resistance (° C.) by an in-water dropping method, the softening temperature (° C.) and the compression strength (MPa) were measured, and the results are shown in Table 2-1. Here, the porosity was measured by a method in accordance with JIS R1634, the thermal expansion coefficient by a method in accordance with JIS R1618, the thermal shock resistance by a method in accordance with JIS R1648, the softening temperature by a method in accordance with JIS R2209, and the compression strength by a method in accordance with JIS R1608. Further, with respect to the compression strength, from each honeycomb sintered product, a square test specimen having cross-sectionally 5×5 cells and a length of 15 mm, was cut out, and this specimen was measured from three directions i.e. (A) in the lengthwise axial direction (axial), (B) in the vertical direction (tangential) and (C) in the direction inclined by 45° from the lengthwise axis (diagonal).

TABLE 2-1

| | Porosity (%) | Thermal expansion coefficient ($10^{-6} K^{-1}$) | Thermal shock resistance (° C.) | Softening temperature (° C.) | Compression strength (MPa) | | |
|---|---|---|---|---|---|---|---|
| | | | | | (A) | (B) | (C) |
| Example 2-1 | 34 | 1.2 | 950 | 1670 | >5.0 | >2.5 | >1.2 |
| Example 2-2 | 35 | 1.5 | 880 | 1620 | >8.3 | >5.1 | >1.0 |
| EXAMPLE 2-3 | 32 | 0.9 | 1220 | 1680 | >4.3 | >2.3 | >1.0 |
| Comparative Example 2-1 | 30 | 0.8 | 980 | 1680 | >0.4 | >0.1 | >0.1 |
| Comparative Example 2-2 | 35 | 0.6 | 650 | 1320 | >10 | >1.3 | >0.2 |

As is evident from Table 2-1, each of the honeycomb carriers in Examples 2-1, 2-2 and 2-3 has a compression strength sufficient for practical use. The honeycomb carrier in Comparative Example 2-1 has low strength insufficient for practical use, and the honeycomb carrier in Comparative Example 2-2 has a low softening temperature and is thereby poor in heat resistance.

Thermal Decomposition Resistance Test

From each of the honeycomb carriers in Examples 2-1 and 2-2 and Comparative Example 2-1, a test specimen of 10 mm×10 mm×10 mm was cut out and held in a high temperature atmosphere of 1,000° C., whereby the change with time of the remaining ratio β (%) of aluminum titanate was investigated to carry out a thermal decomposition resistance test.

Here, the remaining ratio of aluminum titanate was obtained by the following method from the spectrum of the X-ray diffraction measurement (XRD).

Firstly, as $Al_2O_3$ (corundum) and $TiO_2$ (rutile) are formed when aluminum titanate undergoes thermal decomposition, using the integrated intensity ($I_{TiO2(110)}$) of the diffraction peak at the (110) face of rutile and the integrated intensity ($I_{AT(023)}$) of the diffraction peak at the (023) face of aluminum titanate, the intensity ratio r of aluminum titanate to rutile was obtained by the following formula:

$$r = I_{AT(023)} / (I_{AT(023)} + I_{TiO2(110)})$$

Further, also with respect to the sintered product before carrying out the thermal treatment at 1,000° C., the intensity ratio $r_0$ of aluminum titanate to rutile was obtained in the same manner. Then, using r and $r_0$ obtained as described above, the remaining ratio β(%) of aluminum titanate was obtained by the following formula:

$$β = (r/r_0) \times 100$$

Figure 2:
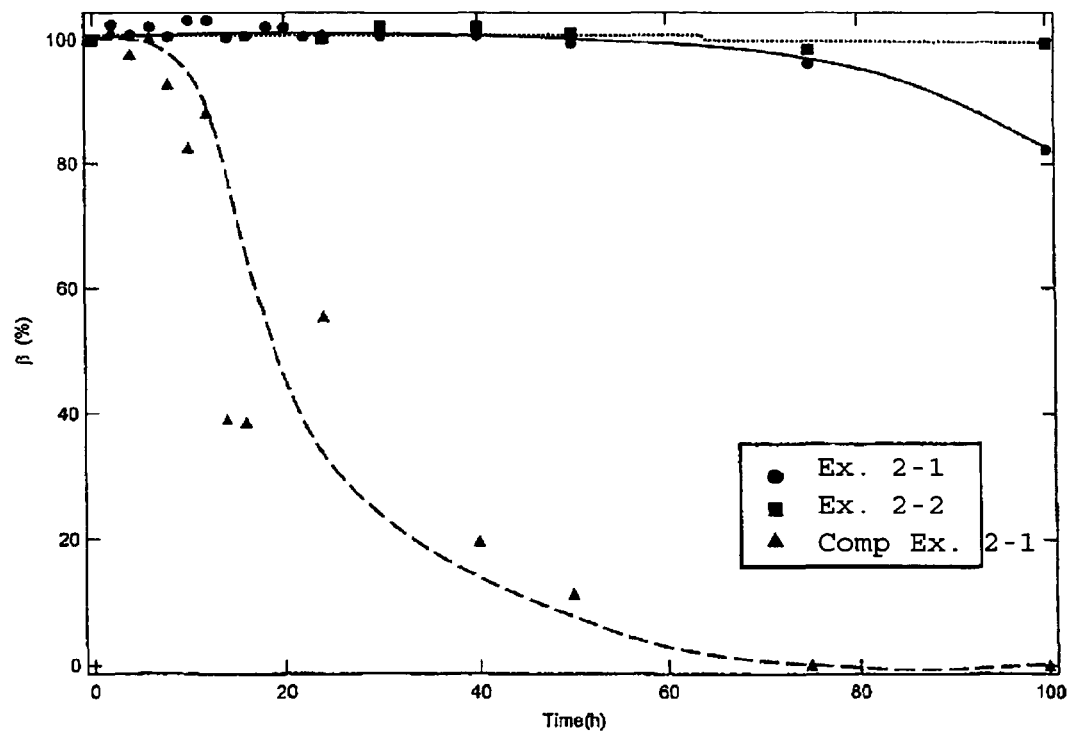
FIG. 2 shows the changes with time of the remaining ratios β of aluminum titanate with respect to the sintered products in Examples 2-1 and 2-2 of the present invention and Comparative Example 2-1.

With respect to the respective honeycomb shape sintered products in Examples 2-1 and 2-2 and Comparative Example 2-1, the changes with time of the remaining ratio β of aluminum titanate are shown by a graph in FIG. 2. As is evident from FIG. 2, Examples 2-1 and 2-2 are superior in the thermal decomposition resistance, as the remaining ratio is maintained at a high level over a long time, as compared with Comparative Example 2-1. Further, it is evident that while the remaining ratio in Example 2-1 after expiration of 100 hours in FIG. 2 is slightly low, the remaining ratio in Example 2-2 is still remained at a high level and thus shown that the thermal decomposition resistance is further excellent over Example 2-1.

Alkali Resistance Test with Respect to Honeycomb Bodies

The following test was carried out to examine the corrosion resistance of the honeycomb bodies against a potassium-containing catalyst which is a catalyst for removal of NOx in an exhaust gas of an automobile. A honeycomb carrier against an exhaust gas of an automobile is used at a temperature of from room temperature to 850° C., and the potassium concentration of the potassium-containing catalyst is not so high. However, in this test, an accelerated test under severe conditions was carried out, which comprises dipping a test specimen in an aqueous potassium nitrate solution at a concentration of 1 mol/liter, drying it and holding it in a furnace maintained at a temperature of 900° C. for a long period of time.

Test Method

From each of the honeycomb bodies in Examples 2-1 and 2-2 and Comparative Example 2-2, a test specimen with a 30 mm square cross section and a length of 50 mm was cut out, and the test specimen was dipped in an aqueous potassium nitrate solution at a concentration of 1 mol/liter at room temperature for 1 hour, and then dried at 70° C. for 1 hour. The dried honeycomb body was inserted into a tubular furnace with an inner diameter of 5 cm and a length of 42 cm and held for a predetermined time under the following conditions while supplying the air containing 10% of moisture to the tubular furnace at 25 cc/min. Then, the honeycomb body taken out from the tubular furnace was subjected to XRD measurement to examine degeneration of the honeycomb body material. The air containing 10% of moisture to be supplied to the tubular furnace was prepared by making the air pass through a water tank controlled at 60° C. The results of the test are shown in Table 2-2.

Holding Conditions:

Temperature in the furnace: 900° C., temperature-raising and lowering rate of the furnace: 100° C./hr, holding time: 50 hours, 100 hours, 150 hours or 200 hours

TABLE 2-2

| Honeycomb body | Holding time | | | |
|---|---|---|---|---|
| | 50 hours | 100 hours | 150 hours | 200 hours |
| Example 2-1 | No change | No change | No change | No change |
| Example 2-2 | No change | No change | No change | No change |
| Comparative Example 2-2 | No change | Peak of $KAlSiO_4$ observed in the vicinity of 2θ = 28° | Peak of $KAlSiO_4$ improved | Peak of $KAlSiO_4$ improved |

As is evident from results shown in Table 2-2, each of the honeycomb carriers in Examples 2-1 and 2-2 is excellent in corrosion resistance to an alkali.

The invention claimed is:

1. An aluminum magnesium titanate honeycomb carrier for an exhaust gas-cleaning catalyst, wherein the material for the aluminum magnesium titanate honeycomb carrier is an aluminum magnesium titanate sintered product obtained by firing at from 1,000 to 1,700° C. a raw mixture comprising:

100 parts by mass, as calculated as oxides, of a mixture comprising a Mg-containing compound, an Al-containing compound and a Ti-containing compound in the same metal component ratio as the metal component ratio of Mg, Al and Ti in an aluminum magnesium titanate represented by the empirical formula $Mg_xAl_{2(1-x)}Ti_{(1+x)}O_5$ (wherein 0<x≤0.5); and from 1 to 10 parts by mass of an alkali feldspar represented by the empirical formula $(Na_yK_{1-y})AlSi_3O_8$ (wherein 0<y<1);

a remaining ratio α (%) of the aluminum magnesium titanate honeycomb carrier is higher than the remaining ratio α (%) of an aluminum titanate honeycomb carrier after both the aluminum magnesium titanate honeycomb carrier and the aluminum titanate honeycomb carrier are held at 1100° C. for 300 hrs, wherein the aluminum titanate honeycomb carrier is obtained by firing at 1400° C. a mixture of α-alumina and anatase-type titanium oxide and an alkali feldspar represented by $(Na_{0.6}K_{0.4})AlSi_3O_8$; and solid-solubilized $Si^{+4}$ and $Mg^{+2}$ sexivalent pairs are substituted for sexivalent $Al^{+3}$ pairs in the crystal grains of the aluminum magnesium titanate honeycomb carrier to synergistically suppress diffusion of cations into the aluminum magnesium titanate honeycomb carrier and increase the thermal decomposition resistance of the aluminum magnesium titanate honeycomb carrier.

2. The aluminum magnesium titanate honeycomb carrier according to claim 1, having a wall thickness in a range of 0.05 to 0.6 mm, a cell density in a range of 15 to 124 cells/cm$^2$, a porosity of the partition wall in a range of 20 to 50%, and a thermal expansion coefficient of at most $3.0\times10^{-6}$ $K^{-1}$.

3. The aluminum magnesium titanate honeycomb carrier according to claim 1, wherein the catalyst comprises an alkali metal or alkaline earth metal component to remove NOx in the exhaust gas.

4. The aluminum magnesium titanate honeycomb carrier according to claim 1, wherein the exhaust gas is an exhaust gas of an automobile wherein a fuel is directly jetted into an engine, or of a system wherein a fuel is diluted and burned.

5. The aluminum magnesium titanate honeycomb carrier according to claim 1, wherein the raw mixture comprises the alkali feldspar represented by the empirical formula $(Na_yK_{1-y})AlSi_3O_8$ where y ranges from 0.15 to 0.85.

6. The aluminum magnesium titanate honeycomb carrier according to claim 1, wherein the raw mixture comprises the alkali feldspar in amounts in a range of 3 to 5 parts by mass.

7. The aluminum magnesium titanate honeycomb carrier according to claim 1, wherein the average particle size of the raw mixture is less than 10 μm.

8. The aluminum magnesium titanate honeycomb carrier according to claim 1, wherein the average particle size of the raw mixture is in a range of 1 to 5 μm.

9. The aluminum magnesium titanate honeycomb carrier according to claim 1, wherein the firing temperature is in a range of 1250 to 1450° C.

10. The aluminum magnesium titanate honeycomb carrier according to claim 1, wherein the catalyst comprises potassium.

11. The aluminum magnesium titanate honeycomb carrier according to claim 1, wherein said aluminum magnesium titanate honeycomb carrier does not show a peak of $KAlSiO_4$ in the vicinity of 2θ=28° in X-ray diffraction measurement in comparison to a honeycomb carrier of aluminum magnesium titanate without the alkali feldspar after a test is carried out, wherein the test comprises dipping the aluminum magnesium titanate honeycomb carrier in an aqueous potassium nitrate solution at a concentration of 1 mol/liter, drying and holding the aluminum magnesium titanate honeycomb carrier in a furnace maintained at a temperature of 900° C. for 100 hours.

12. The aluminum magnesium titanate honeycomb carrier according to claim 1, wherein said aluminum magnesium titanate honeycomb carrier does not show a peak of $KAlSiO_4$ in the vicinity of 2θ=28° in X-ray diffraction measurement in comparison to a honeycomb carrier of aluminum magnesium titanate without the alkali feldspar after a test is carried out, wherein the test comprises dipping the aluminum magnesium titanate honeycomb carrier in an aqueous potassium nitrate solution at a concentration of 1 mol/liter, drying and holding the aluminum magnesium titanate honeycomb carrier in a furnace maintained at a temperature of 900° C. for 150 hours.

13. The aluminum magnesium titanate honeycomb carrier according to claim 1, wherein said aluminum magnesium titanate honeycomb carrier does not show a peak of $KAlSiO_4$ in the vicinity of 2θ=28° in X-ray diffraction measurement in comparison to a honeycomb carrier of aluminum magnesium titanate without the alkali feldspar after a test is carried out, wherein the test comprises dipping the aluminum magnesium titanate honeycomb carrier in an aqueous potassium nitrate solution at a concentration of 1 mol/liter, drying and holding the aluminum magnesium titanate honeycomb carrier in a furnace maintained at a temperature of 900° C. for 200 hours.

14. The aluminum magnesium titanate honeycomb carrier according to claim 1, wherein the material for the aluminum magnesium titanate honeycomb carrier is an aluminum magnesium titanate sintered product obtained by firing at from 1300 to 1450° C. a raw mixture comprising:

100 parts by mass, as calculated as oxides, of a mixture comprising a Mg-containing compound, an Al-containing compound and a Ti-containing compound in the same metal component ratio as the metal component ratio of Mg, Al and Ti in an aluminum magnesium titanate represented by the empirical formula $Mg_xAl_{2(1-x)}Ti_{(1+x)}O_5$ (wherein 0<x<1); and from 1 to 10 parts by mass of an alkali feldspar represented by the empirical formula $(Na_yK_{1-y})AlSi_3O_8$ (wherein 0<y<1), and a difference between the remaining ratio α (%) of the aluminum magnesium titanate honeycomb carrier after being held at 1100° C. for from 80 to 100 hrs and a remaining ratio β (%) of an aluminum titanate honeycomb carrier after being held at 1000° C. for 80 to 100 hrs is from 4% to 16%, wherein the aluminum titanate honeycomb carrier is obtained by firing at 1400° C. a mixture of α-alumina and anatase-type titanium oxide and an alkali feldspar represented by $(Na_{0.6}K_{0.4})AlSi_3O_8$.

15. The aluminum magnesium titanate honeycomb carrier according to claim 1, wherein a difference between the remaining ratio α (%) of the aluminum magnesium titanate honeycomb carrier after being held at 1100° C. for from 80 to 100 hrs and a remaining ratio β (%) of an aluminum titanate honeycomb carrier after being held at 1000° C. for 80 to 100 hrs is from 4% to 16%, wherein the aluminum titanate honeycomb carrier is obtained by firing at 1400° C. a mixture of α-alumina and anatase-type titanium oxide and an alkali feldspar represented by $(Na_{0.6}K_{0.4})AlSi_3O_8$.

* * * * *